(12) United States Patent  
Cheng

(10) Patent No.: US 9,836,724 B2
(45) Date of Patent: Dec. 5, 2017

(54) EMAIL VIEWS

(75) Inventor: David J. Cheng, Cupertino, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 12/766,484

(22) Filed: Apr. 23, 2010

(65) Prior Publication Data
US 2011/0264685 A1    Oct. 27, 2011

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
CPC ....... H04L 67/22; H04L 51/32; H04L 67/104; H04L 51/16; H04L 29/06176; H04L 51/28; H04L 61/307; G06F 17/30867; G06Q 10/107
USPC ......................................................... 709/206
See application file for complete search history.

(56) References Cited

U.S. PATENT DOCUMENTS

| | | |
|---|---|---|
| 6,606,644 B1 | 8/2003 | Ford et al. |
| 6,704,771 B1 | 3/2004 | Gough |
| 6,784,899 B1 * | 8/2004 | Barrus et al. ................ 715/717 |
| 6,895,438 B1 | 5/2005 | Ulrich |
| 6,965,926 B1 | 11/2005 | Shapiro et al. |
| 7,512,659 B2 | 3/2009 | Keohane et al. |
| 7,599,952 B2 | 10/2009 | Parkinson |
| 7,865,394 B1 | 1/2011 | Calloway et al. |
| 9,185,064 B2 | 11/2015 | Craddock et al. |
| 2002/0013692 A1 * | 1/2002 | Chandhok et al. ............... 704/1 |
| 2002/0073117 A1 | 6/2002 | Newman |
| 2002/0078158 A1 | 6/2002 | Brown et al. |
| 2002/0107931 A1 | 8/2002 | Singh et al. |
| 2003/0018731 A1 | 1/2003 | Watanabe et al. |
| 2003/0135659 A1 | 7/2003 | Bellotti et al. |
| 2003/0212902 A1 | 11/2003 | van der Made |
| 2003/0217061 A1 | 11/2003 | Agassi et al. |
| 2004/0003097 A1 | 1/2004 | Willis et al. |
| 2005/0010646 A1 | 1/2005 | Shiina |
| 2005/0027779 A1 | 2/2005 | Schinner |
| 2005/0038861 A1 | 2/2005 | Lynn et al. |

(Continued)

FOREIGN PATENT DOCUMENTS

| | | |
|---|---|---|
| CN | 1610907 | 4/2005 |
| CN | 1771498 | 5/2006 |

(Continued)

OTHER PUBLICATIONS

"International Search Report", dated Apr. 28, 2011, Application No. PCT/US2010/049005, Filed Date: Sep. 15, 2010, pp. 10.
"Webmaster Tool Help", Retrieved at << http://www.google.com/support/webmasters/bin/answer.py?hl=en&answer=99170>>, Feb. 24, 2010, pp. 2.
Max., "Google Visualization API", Retrieved at << http://www.maxkiesler.com/2009/07/19/google-visualization-api/>>, Jul. 19, 2009, pp. 2.

(Continued)

*Primary Examiner* — Karen Tang

(57) ABSTRACT

Email viewing techniques are described. In implementations, a determination is made regarding one or more types of content that are included in an email through examination of metadata that describes the one or more types of content. The determination is made responsive to selection of an email in a user interface for output. A choice is made from one of a plurality of views for the email based on the determination; and the email is output in a user interface using the chosen view.

22 Claims, 6 Drawing Sheets

(56) References Cited

U.S. PATENT DOCUMENTS

| | | | |
|---|---|---|---|
| 2005/0044003 A1 | 2/2005 | O'Keeffe et al. | |
| 2005/0060341 A1 | 3/2005 | Shiina | |
| 2005/0154692 A1 | 7/2005 | Jacobsen et al. | |
| 2005/0193369 A1 | 9/2005 | Brumme et al. | |
| 2005/0278626 A1* | 12/2005 | Malik | 715/530 |
| 2006/0020548 A1 | 1/2006 | Flather | |
| 2006/0064469 A1 | 3/2006 | Balasubrahmaniyan et al. | |
| 2006/0080269 A1* | 4/2006 | MacLaurin | 706/45 |
| 2006/0080278 A1* | 4/2006 | Neiditsch et al. | 707/1 |
| 2006/0150256 A1 | 7/2006 | Fanton et al. | |
| 2006/0161868 A1* | 7/2006 | Van Dok et al. | 715/835 |
| 2006/0190830 A1* | 8/2006 | Gerstl et al. | 715/757 |
| 2006/0224937 A1* | 10/2006 | Sudoh et al. | 715/500 |
| 2006/0259763 A1 | 11/2006 | Cooperstein et al. | |
| 2007/0016609 A1 | 1/2007 | Kim et al. | |
| 2007/0078872 A1 | 4/2007 | Cohen | |
| 2007/0257916 A1* | 11/2007 | Krishnamoorthi | 345/440 |
| 2007/0271129 A1 | 11/2007 | Dutton et al. | |
| 2008/0046831 A1* | 2/2008 | Imai et al. | 715/765 |
| 2008/0086703 A1* | 4/2008 | Flynt et al. | 715/853 |
| 2008/0119168 A1* | 5/2008 | Farkas et al. | 455/412.1 |
| 2008/0126353 A1* | 5/2008 | Baude et al. | 707/10 |
| 2008/0127292 A1 | 5/2008 | Cooper et al. | |
| 2008/0141154 A1* | 6/2008 | Balassanian | 715/769 |
| 2008/0147814 A1 | 6/2008 | Damm et al. | |
| 2008/0163359 A1 | 7/2008 | Conti et al. | |
| 2008/0244022 A1* | 10/2008 | Johnson | 709/206 |
| 2008/0306972 A1 | 12/2008 | Wilkin et al. | |
| 2009/0013053 A1 | 1/2009 | Wehner et al. | |
| 2009/0030774 A1 | 1/2009 | Rothschild et al. | |
| 2009/0077182 A1 | 3/2009 | Banjara et al. | |
| 2009/0089380 A1* | 4/2009 | Wang et al. | 709/206 |
| 2009/0100073 A1 | 4/2009 | Dargahi et al. | |
| 2009/0100332 A1 | 4/2009 | Kanjilal et al. | |
| 2009/0106674 A1* | 4/2009 | Bray et al. | 715/762 |
| 2009/0112806 A1* | 4/2009 | Cheng et al. | 707/3 |
| 2009/0138937 A1 | 5/2009 | Erlingsson et al. | |
| 2009/0157818 A1* | 6/2009 | Cook et al. | 709/206 |
| 2009/0177962 A1* | 7/2009 | Gusmorino et al. | 715/243 |
| 2009/0183251 A1* | 7/2009 | Deinlein et al. | 726/12 |
| 2009/0307615 A1* | 12/2009 | Jalon et al. | 715/763 |
| 2010/0005399 A1* | 1/2010 | Friedman et al. | 715/752 |
| 2010/0024036 A1 | 1/2010 | Morozov et al. | |
| 2010/0030860 A1* | 2/2010 | Iwasawa et al. | 709/206 |
| 2010/0057864 A1* | 3/2010 | Laird-McConnell | 709/206 |
| 2010/0125448 A1* | 5/2010 | Goswami | 704/8 |
| 2010/0161903 A1* | 6/2010 | Sato et al. | 711/118 |
| 2010/0223664 A1* | 9/2010 | Naranjo et al. | 726/10 |
| 2010/0299396 A1* | 11/2010 | Memon et al. | 709/206 |
| 2011/0066692 A1* | 3/2011 | Ciancio-Bunch et al. | 709/206 |
| 2011/0078612 A1* | 3/2011 | Matsuzawa et al. | 715/772 |
| 2011/0145768 A1* | 6/2011 | Leffert et al. | 715/863 |
| 2011/0145926 A1 | 6/2011 | Dalcher et al. | |
| 2011/0167354 A1* | 7/2011 | Raghunath et al. | 715/738 |
| 2011/0179362 A1 | 7/2011 | Craddock et al. | |
| 2011/0191098 A1* | 8/2011 | Thomas et al. | 704/9 |
| 2011/0208732 A1* | 8/2011 | Melton et al. | 707/728 |
| 2011/0225257 A1* | 9/2011 | Tilden et al. | 709/207 |
| 2011/0246945 A1* | 10/2011 | Caine et al. | 715/835 |
| 2011/0302258 A1* | 12/2011 | Huynh et al. | 709/206 |
| 2012/0023416 A1* | 1/2012 | Khoo | 715/752 |
| 2012/0042025 A1 | 2/2012 | Jamison et al. | |
| 2012/0321196 A1* | 12/2012 | Tanigawa et al. | 382/195 |

FOREIGN PATENT DOCUMENTS

| | | |
|---|---|---|
| CN | 101681357 | 3/2010 |
| EP | 1182600 | 2/2002 |
| EP | 1236331 | 7/2003 |
| WO | WO-0052551 | 9/2000 |
| WO | WO-2009108387 | 9/2009 |

OTHER PUBLICATIONS

Ukelson, Jacob., "Combining Structured, Semistructured and Unstructured Data in Business Applications", Retrieved at << http://www.information-management.com/infodirect/20061201/1069202-1.html >>, Dec. 2006, pp. 5.

"Xoopit Team Blog", Retrieved from: <http://blog.xoopit.com/> on Apr. 23, 2010, (Jul. 22, 2009),8 pages.

"TripIt—Travel Itinerary", Retrieved from: <http://www.tripit.com/> on Apr. 23, 2010, (Apr. 23, 2010),1 page.

"Final Office Action", U.S. Appl. No. 12/688,479, dated May 8, 2014, 31 pages.

"Extended European Search Report", EP Application No. 11733268.4, dated Mar. 5, 2014, 8 pages.

"International Search Report and Written Opinion", Application No. PCT/US2011/020827, dated Aug. 19, 2011, 9 pages.

"Java Virtual Machine", Wikipedia, Dec. 30, 2009, 6 pages.

"Non-Final Office Action", U.S. Appl. No. 12/688,479, dated Sep. 12, 2014, 28 pages.

"Notice of Allowance", U.S. Appl. No. 12/688,479, dated Jul. 2, 2015, 12 pages.

"Foreign Office Action", CN Application No. 201110112082.5, dated May 22, 2015, 13 Pages.

"Final Office Action", U.S. Appl. No. 12/688,479, (dated Aug. 23, 2012), 28 pages.

"11 Ways Computer Viruses are Spread", retrieved from <http://antivirus-software.topchoicereviews.com/11-ways-computer-viruses-are-spread_216.html> on Aug. 18, 2013 using the version captured on Dec. 2, 2008 from www.archive.org, (Dec. 2, 2008), 3 pages.

"How Does a Computer Get Infected with a Virus or Spyware?", retrieved from <http://www.computerhope.com/issues/ch001045.htm> on Aug. 18, 2013 using the version captured on Apr. 11, 2008 from www.archive.org, (Apr. 11, 2008), 3 pages.

"Non-Final Office Action", U.S. Appl. No. 12/688,479, (dated Sep. 9, 2013), 37 pages.

"Foreign Office Action", CN Application No. 201180006005.X, dated Mar. 2, 2015, 22 pages.

"Final Office Action", U.S. Appl. No. 12/688,479, dated Feb. 24, 2015, 31 pages.

"Email Marketing Solutions (Formerly Email Labs)", Website, 2009 Lyris Inc., retrieved from <http://www.lyris.com/solutions/lyris-hq/email-marketing/> on Nov. 9, 2009, 2 pages.

"Non-Final Office Action", U.S. Appl. No. 12/688,479, (dated Feb. 6, 2012), 35 pages.

Bellotti, Victoria et al., "Taking Email to Task: The Design and Evaluation of a Task Management Centered Email Tool", *Conference on Human Factors in Computing Systems, Proceedings of the SIGCHI Conference on Human Factors in Computing Systems,* ACM, New York, NY, (2003), 8 pages.

Hendrickson, Mark "Fuser: Manage All Your Email and Social Networking Messages in One Place", retrieved from <http://www.techcrunch.com/2007/09/25/fuser-manage-all-your-email-and-social-networking-messages-in-one-place/,(Sep. 25, 2007), 16 pages.

Surendran, Arun C., et al., "Automatic Discovery of Personal Topics to Organize Email", *Microsoft Research, 2nd Conference on Email and Anti-Spam,* retrieved from <http://www.ceas.cc/papers-2005/145.pdf,(Jul. 2005), 6 pages.

"Foreign Office Action", CN Application No. 201180006005.X, dated Oct. 29, 2015, 22 pages.

"Corrected Notice of Allowance", U.S. Appl. No. 12/688,479, dated Oct. 13, 2015, 7 pages.

"Extended European Search Report", EP Application No. 10850394.7, dated Feb. 20, 2015, 7 pages.

"Office Action Issued in European Patent Application No. 10850394.7", dated Feb. 19, 2016, 5 Pages.

\* cited by examiner

EMAIL VIEWS

BACKGROUND

Email (also referred to as electronic mail) allows users to exchange content across a network. Originally, email was configured to include textual content that was communicated through the use of a header across a network between desktop computing devices and servers. The functionality of email continues to expand, such that email may be used to communicate a wide variety of different content to a wide variety of computing devices. However, traditional techniques that were used to view emails remain relatively unchanged and therefore provide a view of the email having limited "richness."

SUMMARY

Email viewing techniques are described. In implementations, a determination is made regarding one or more types of content that are included in an email through examination of metadata that describes the one or more types of content. The determination is made responsive to selection of an email in a user interface for output. A choice is made from one of a plurality of views for the email based on the determination; and the email is output in a user interface using the chosen view.

In implementations, a plurality of emails received via a network connection at the client device is parsed to locate content using metadata, the metadata being communicated with the email and describing respective content. The content from the plurality of emails is combined that pertains to a particular event and the combined content is output that pertains to the particular event in a user interface at the client device.

In implementations, one or more computer-readable media comprise instructions that are stored thereon that, responsive to execution by a client device, cause the client device to output a user interface having a plurality of representations of views that are selectable to show different combinations of content taken from emails received by the client device via a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Email was originally used to communicate text between computers over a network. The functionality of email continued to increase to include content of ever expanding types, such as files, images, and so on. However, the traditional techniques that were developed to view email have not changed and therefore give a relatively static view of the email.

Email viewing techniques are described. In implementations, content of email is leveraged to provide a variety of views of the email. For example, the email may include metadata that describes content included in the email, such as images, dates and times of a travel itinerary, billing information, and so on. This description may be leveraged by an entity that receives the email to provide a variety of different views of the email according to the metadata.

For instance, a user interface may be configured to view images taken from emails without having to view each email, separately. In this way, a user may readily locate a desired image without navigating through each of the emails. In another instance, content from emails may be combined, such as to show a view of a travel itinerary using content taken from a plurality of emails, such as an airfare confirmation, hotel confirmation, car rental confirmation, and so on. A variety of other views and metadata techniques are also contemplated, further discussion of which may be found in relation to the following sections.

In the following discussion, an example environment is first described that is operable to perform email viewing techniques. Example metadata schema and example procedures are then described, which may be performed in the example environment and elsewhere. Accordingly, the example environment is not limited to implementation of the example metadata schema and example procedures. Likewise, the example procedures and example metadata schema are not limited to implementation in the example environment.

Example Environment

Figure 1:
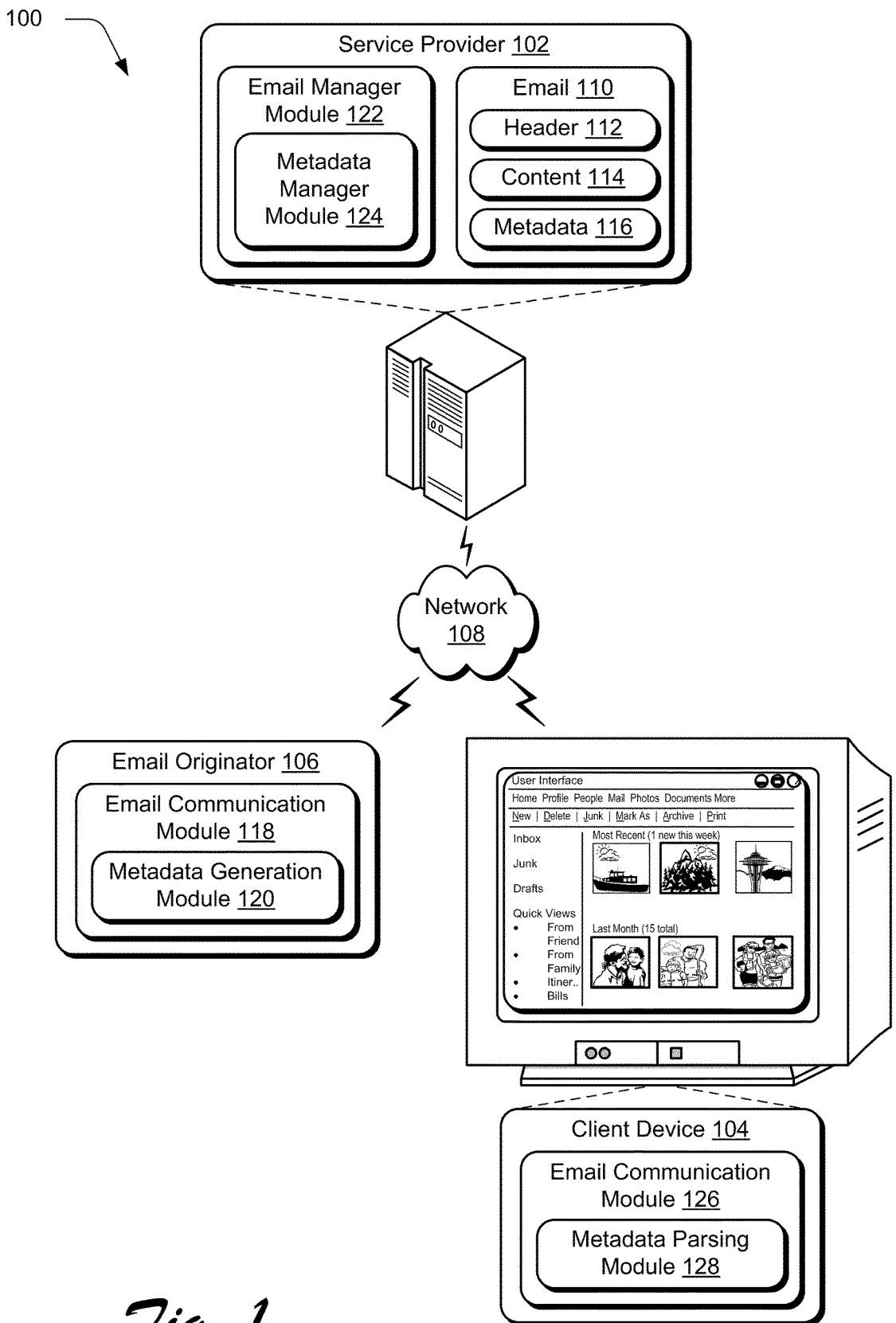
FIG. 1 is an illustration of an environment in an example implementation that is operable to perform email viewing techniques.

FIG. 1 is an illustration of an environment 100 in an example implementation that is operable to employ email viewing techniques. The illustrated environment 100 includes a service provider 102, a client device 104, and an email originator 106, each of which are communicatively coupled, one to another, over a network 108. The client device 104 and the email originator 106 may be implemented via a variety of different computing devices. For example, the client device 104 and/or the email originator 106 may be configured as a computer that is capable of communicating over the network 108, such as a desktop computer, a mobile station, an entertainment appliance, a set-top box communicatively coupled to a display device, a wireless phone, a netbook, a tablet computer, a game console, and so forth. Thus, the client device 104 and/or the email originator 106 may range from full resource devices with substantial memory and processor resources (e.g., personal computers, game consoles) to a low-resource device with limited memory and/or processing resources (e.g., traditional set-top boxes, hand-held game consoles). Likewise, the service provider 102 may be implemented by one or more computing devices, such as through one or more servers as illustrated.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. For instance, the email originator 106 and the service provider 102 may use a corporate Intranet to communicate, one to another. Additionally, both the client device 104 and the service provider 102 may be communicatively coupled over the Internet. A wide variety of other instances are also contemplated.

A service provider 102 is illustrated as having an email 110 that was composed at the email originator 106 for delivery to the client device 104, e.g., through a "store and forward" technique. Other embodiments are also contemplated, however, such as through direct delivery of the email from the email originator 106 to the client device 104 (i.e., the email originator 106 and the service provider 102 are combined). For purposes of the following discussion, the email 110 may be representative of one or more emails. Accordingly, the email 110 may be referred to in singular (e.g., the email 110) and plural (e.g., the emails 110) forms.

The email 110 includes a header 112 and content 114. The header 112 includes information that is usable to deliver the email 110, such as an email address of an intended recipient. e.g., the client device 104. The header 112 may also include other information such as an email address of the email originator 106, a subject header, and so on.

The content 114 may be representative of a variety of different types of content that may be included in the email 110. For example, the content 114 may include textual content that may be configured in a variety of different ways, such as text of a letter, billing information, purchase confirmation information, contact information, banking information, scheduling information, and so on. The content 114 may also include a variety of non-textual content, such as images, music files, video files, links to other content over the network 108, and so on.

The email 110 is further illustrated as including metadata 116 that describes the content 114 of the email 110. For example, the metadata 116 may follow a schema that may describe both textual and non-textual content 114 of the email 110. This description may then be leveraged to provide rich views that leverage the particular types of content 114 included in the email 110. For example, the email originator 106 is illustrated as including an email communication module 118 that is representative of functionality of the email originator 106 to compose the email 110. The email communication module 118, for instance, may provide a user interface that is output to receive inputs that are used to compose the email 110, such as to address the email 110 (i.e., form the header 112) as well as specify content 114 for inclusion in the email 110, e.g., to type text, attach a file, and so on.

The email communication module 118 is also illustrated as including a metadata generation module 120 that is representative of functionality of the email originator 106 to generate the metadata 116 for inclusion in the email 110. As previously described, the metadata 116 generated by the metadata generation module 120 is configured to describe the types of content 114 included in the email. For example, the metadata 116 may include an XML tag that specifies the following content 114 describes a purchase amount. This is different than traditional techniques that specified formatting that is to be applied to the content 114, e.g., an HTML tag specifying that the following text was to be bolded. The email 110 having the header 112, content 114, and metadata 116 is then transmitted by the email originator 106 via the service provider 102 in this example.

The service provider 102 is illustrated as including an email manager module 112 that is representative of functionality to manage email 110 delivery. For example, the email manager module 112 may employ a "store and forward" system to deliver the email 110 to the client device 104 as specified by information in the header 112. The email manager module 122 is also illustrated as including a metadata manager module 124 that is representative of functionality of the service provider 102 regarding the metadata 116. For example, the metadata manager module 124 may be configured to supplement the metadata 116 included in the email 110, reformat the metadata 116, originate "new" metadata for inclusion in the email 110, and so on. The email manager module 122 may then deliver the email 110 to an intended recipient, which is the client device 104 in this example.

The client device 104 is illustrated as included an email communication module 126 that is representative of functionality regarding receipt and viewing of emails. The email communication module 126 may also include functionality to compose emails as previously described for the email communication module 118 of the email originator 106. The email communication module 126 is also illustrated as including a metadata parsing module 128 that is representative of functionality to examine metadata 116 in the email 110 and leverage this examination to provide one or more different views of the email 110. The views may be configured in a variety of ways.

The metadata 116, for example, may be parsed by the metadata parsing module 128 to extract data that describes the content 114 of the email. Thus, in this example the metadata 116 is unstructured. In another example, the metadata 116 may be structured to define the content 114 in the email, such as by following a particular schema. The metadata 116 may then be leveraged to provide views that take advantage of the content 114 included in the email 110, such as to provide a view that is for a specific type of content (e.g., images, documents, and so on), combine content 114 from emails to provide an aggregate view, and so forth, further discussion of which may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, such as digital video discs (DVDs), read-only memory (ROM), compact discs (CDs), hard drives, flash drives, and so on. The features of the email view techniques described below are platform-independent, meaning that the techniques may be implemented on a variety of commercial computing platforms having a variety of processors.

Figure 2:
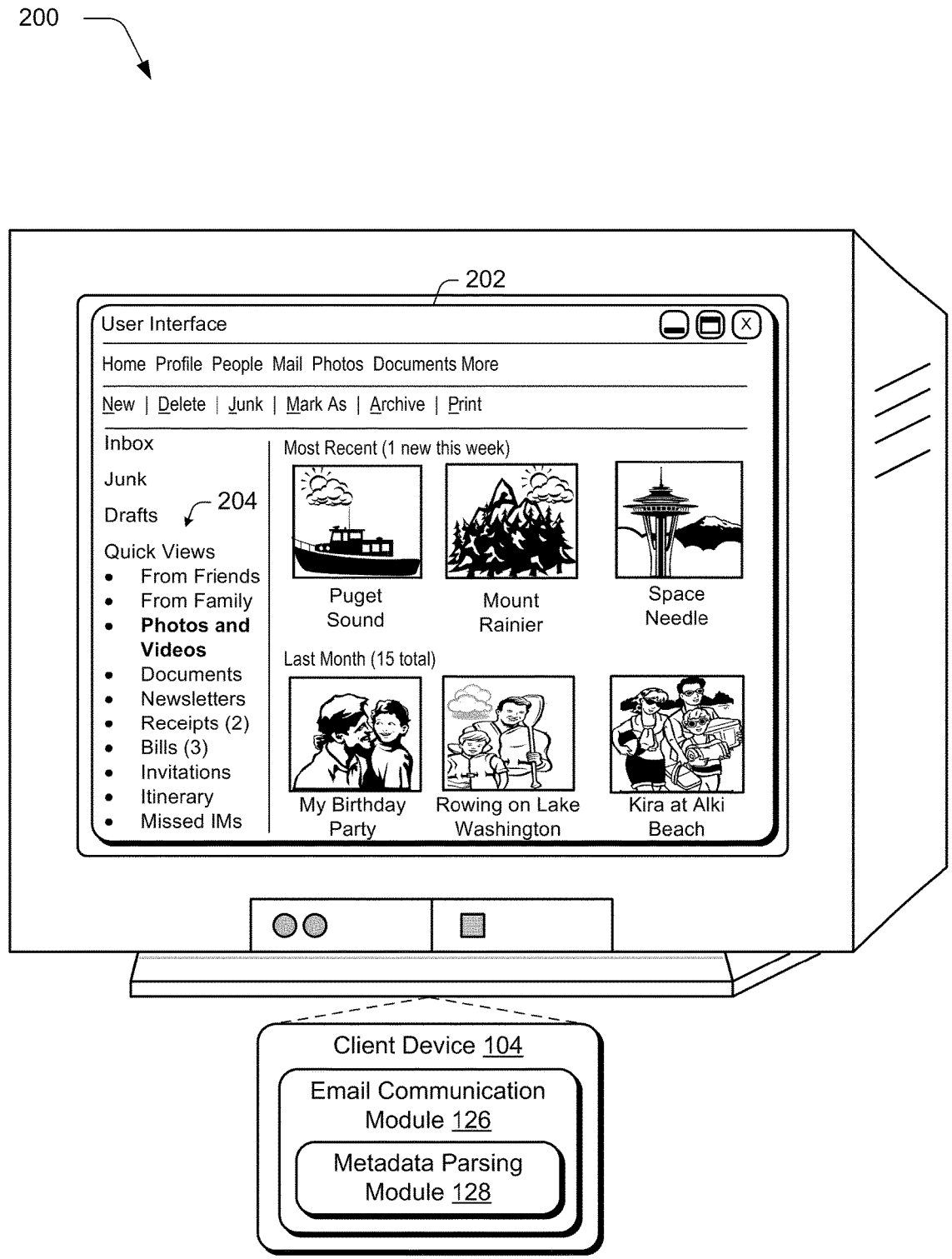
FIG. 2 is an illustration of a system in an example implementation showing a user interface output by a client device of FIG. 1 that is configured to leverage metadata of an email to provide a plurality of views.

FIG. 2 is an illustration of a system 200 in an example implementation showing a user interface 202 output by the client device 104 of FIG. 1 that is configured to leverage metadata 116 of the email 110 to output one or more views. In this example, the user interface 202 includes a plurality of representations 204 of views that are user selectable. Illustrated examples include "From Friends," "From Family," "Photos and Videos," "Documents," "Newsletters," "Receipts," "Bills," "Invitations," "Itinerary," and "Miss IMs." Selection of the representations 204 causes a respective view to be output that leverages the metadata 116 included in the email 110.

The representation "Photos and Videos" is illustrated as selected in the user interface 202. Responsive to this selection, the metadata parsing module 128 causes output of representations photos and videos (e.g., thumbnails) taken from emails received at the client device 104. Representations of the photos and videos are arranged chronologically in groups in this example, which include "most recent" and "last month." Thus, in this example a user may select "photos and videos" from the quick view menu to locate a desired photo or video without having to navigate through a plurality of individual emails. Similar techniques may also be employed to locate different types of content, such as for the "Documents" view, "Newsletters" view, and so on. In another example, content from different emails may be combined that pertain to a common event, further discussion of which may be found in relation to the following figure.

Figure 3:
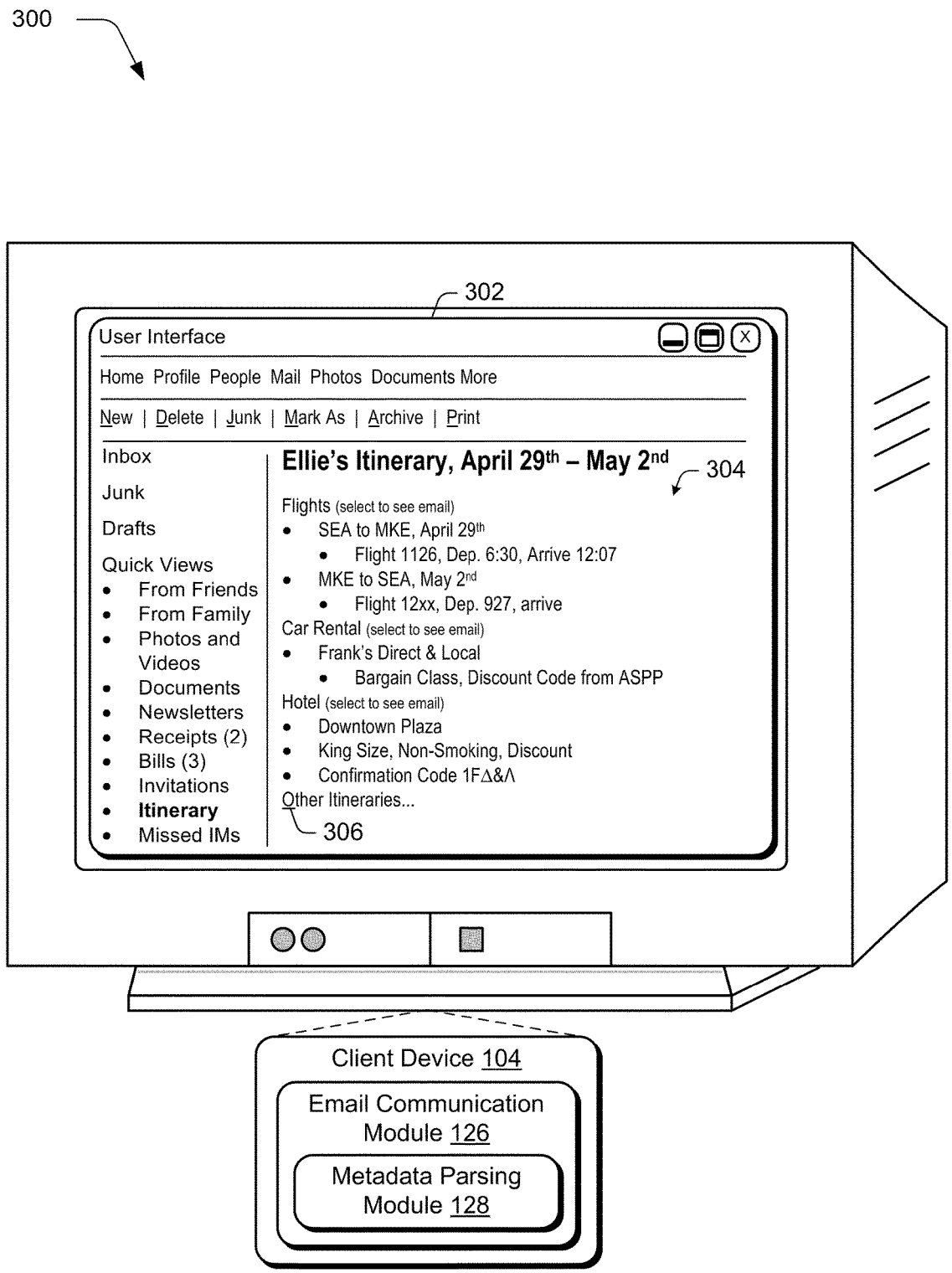
FIG. 3 is another illustration of a system in an example implementation that shows a user interface output by a client device of FIG. 1 that is configured to leverage metadata of a plurality of emails to provide a travel itinerary view.

FIG. 3 is another illustration of a system 300 in an example implementation showing a user interface 302 output by the client device 104 of FIG. 1 that is configured to leverage metadata 116 of a plurality of emails 110 to provide a travel itinerary view 304. The travel itinerary view is configured by the metadata parsing module 128 by collecting metadata 116 from a plurality of emails that pertain to a common event, e.g., such as a common block of time, pertain to a common destination, and so on. The collection of the metadata 116 may be performed in a variety of ways, such as through analysis of a structured schema, unstructured parsing of text of the emails 110, and so on.

This metadata may then be arranged and output as a travel itinerary view 304 in the user interface 302. The illustrated travel itinerary view 304 arranges the metadata information by flights, car rental, and then hotel. The travel itinerary view 304 also include a selectable portion 306 to view other itineraries. Thus, a variety of different metadata 116 may be included in emails 110 by the email originator 106 to support different views of the email 110. Example metadata is further described in the following section.

Example Schema

The following gives examples of metadata schema that may be employed for a variety of different types of content. It should be readily apparent that these are but a few examples, as a metadata schema may be structured in a variety of ways to describe content of an email.

Media and Routing

A variety of different types of media may be incorporated within the email 110. Accordingly, the metadata 116 schema may be configured to describe these types of media. For example, the schema may describe a message type, originating site, a sender's name, and details. The schema may also describe a use for the media, such as to output as a promotional trailer, as well as techniques to consume the media, such as to embed a media player into the email 110. Accordingly, the metadata parsing module 128 may examine the schema and determine a view to be used to display the email 110, and more particularly the content 114 of the email.

Social Networks

Social networks may leverage email to communicate a variety of different content to users of the network. As a "base" level, the metadata schema may describe a message type and subtype, a site and site URL that originated the email, a sender's name and email address, a sender's profile, and so on. The schema may also address a variety of other mechanisms that may be used by the social network to communicate.

The social network, for example, may support notes (e.g., a "wall post") to communicate between users. An email notification may be sent responsive to such a post to notify a user of the note. Accordingly, the metadata schema may be structured to describe the content of the email that pertains to the note, such as the "base level" information above, as well as a sender's profile, message details, a message URL, button text (e.g., "write to your friend's wall"), and so on. Similar schemas may be employed for comments (e.g., comment text, button text to reply, a site URL); invitations such as a friend request, group, request, event request (e.g., sender's profile, event details, button to accept and decline); and so on.

Commercial Email

The metadata schema may be arranged to address a variety of different types of content in commercial email. Emails related to shopping for instance, may include a schema that specifies a message type (e.g., receipt, tracking), originating site, site URL, message details (e.g., order number, tracking number), date, and so on. Likewise, emails relating to finance may include metadata 116 that describes the content 114, such as message type (e.g., bill, payment confirmation, statement), message details (e.g., invoice #, confirmation number), a link to the statement or bill, date and so on. Similar techniques may be used to specify travel information, e.g., a schema that specifies that the email pertains to an itinerary, departure dates, departure information, arrival dates and information, flight numbers, car rental information, and so on. In this way, the metadata parsing module 128 may efficiently locate this content 114 and provide a view that is optimized for the metadata.

Example Procedures

The following discussion describes email view techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
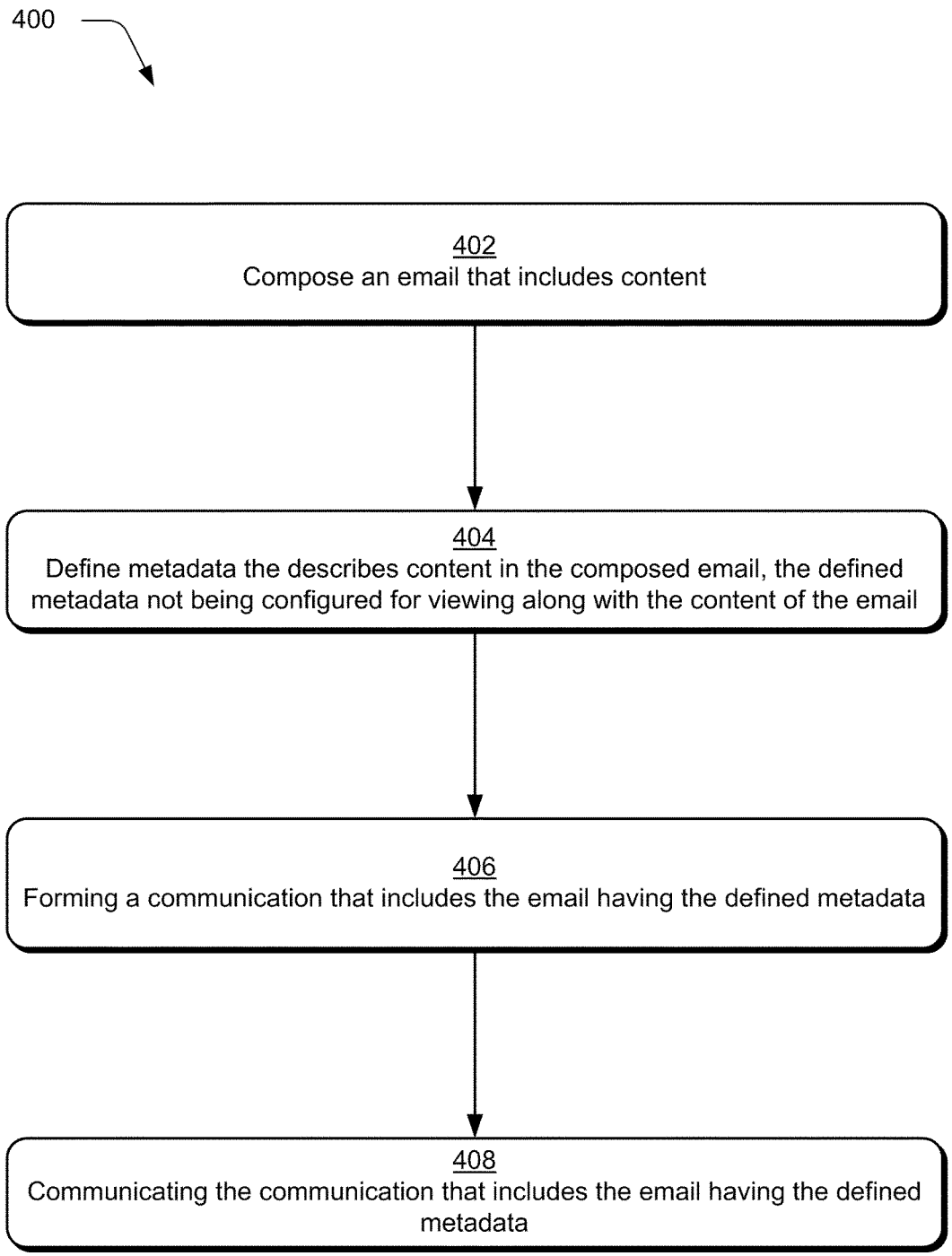
FIG. 4 is a flow diagram depicting a procedure in an example implementation in which metadata is specified by an originator of an email.

FIG. 4 depicts a procedure 400 in an example implementation in which metadata is specified by an originator of an email. An email is composed that includes content (block 402). For example, the email originator 106 may output a user interface that is configured to receive textual and other inputs, e.g., to specify an image and so on.

Metadata is defined that describes the content in the composed email, the defined metadata not being configured for viewing along with the content of the email (block 404). The metadata may be defined in a variety of ways. For example, the metadata generation module 120 may output a user interface such that a user may manually specify the metadata 116. In another example, the metadata generation module 120 may parse the content 114 of the email 110 and generate the metadata that describes the content 114. A variety of other examples are also contemplated, such as through generation of the metadata 116 at the service provider 102 using a metadata manager module 124.

A communication is formed that includes the email having the defined metadata (block 406). The communication, for instance, may form the email 110 to include the header 112, the content 114, and the metadata 116 for communication over the network 108. The communication that includes the email having the defined metadata is communicated (block 408). In this way, the email originator 106 and/or the service provider 102 may provide metadata 116 that may be leveraged to view the content 114, further discussion of which may be found in relation to the following figure.

Figure 5:
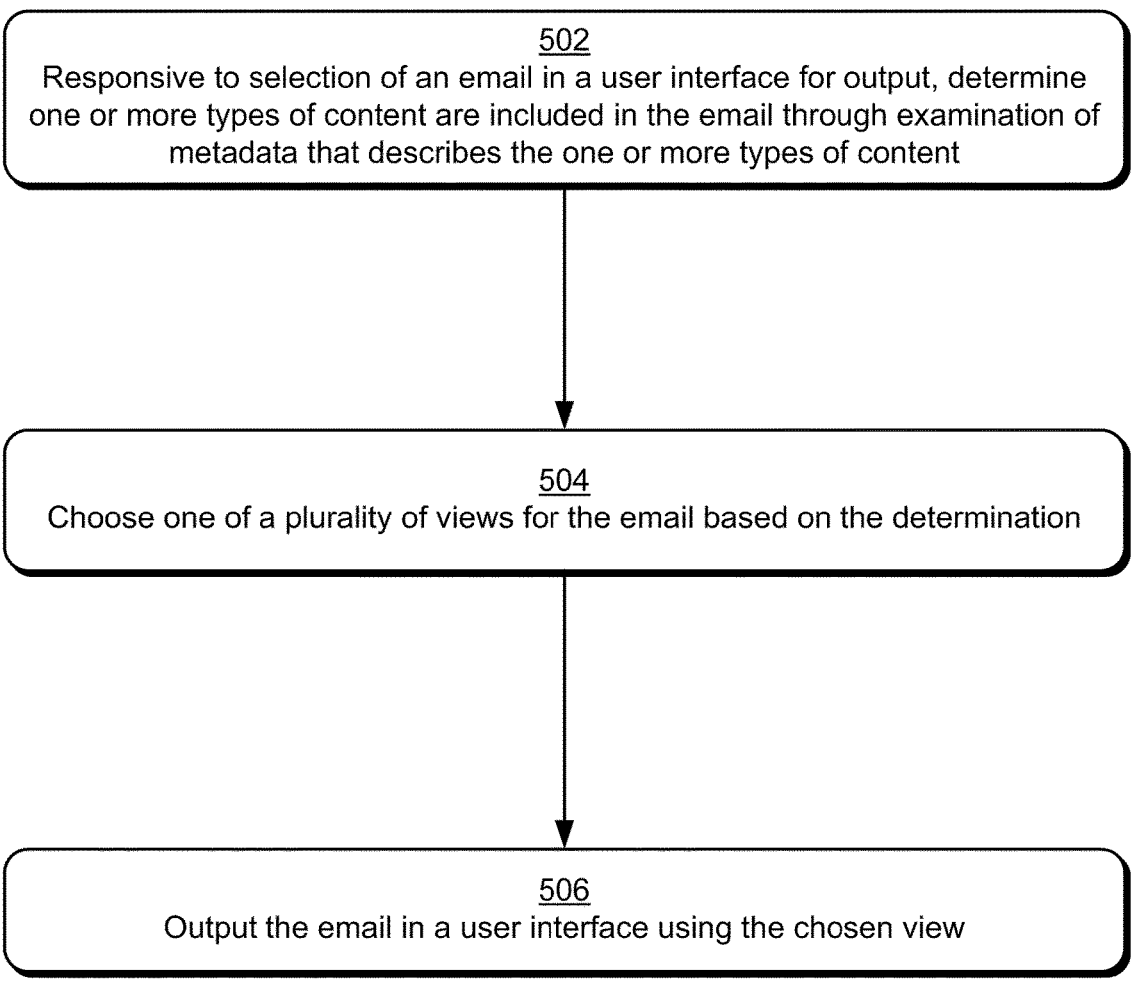
FIG. 5 is a flow diagram depicting a procedure in an example implementation in which a determination is made as to how to view an email based on metadata that describes the content of the email.

FIG. 5 depicts a procedure 500 in an example implementation in which a determination is made as to how to view an email based on metadata that describes the content of the email. Responsive to selection of an email in a user interface for output, a determination is made as to one or more types of content that are included in an email through examination of metadata that describes the one or more types of content (block 502). Continuing with the previous example, the email 110 may be delivered to the client device 104 via the network 108, e.g., directly from the email originator 106, through the service provider 102, and so on. The email 110 includes metadata that describes the content 114 included therein. Therefore, the metadata parsing module 128 may process the metadata 116 to determine the types of content 114 that are included in the email 110.

A choice is made of one of a plurality of views for the email based on the determination (block 504). The email is output in a user interface using the chosen view (block 506). As described, the metadata parsing module 128 may determine from the metadata 116 the type of content 114 included in the email 110. The metadata parsing module 128 may then choose from a plurality of preconfigured views a particular view that corresponds to the type. For example, the metadata parsing module 128 may determine that the email 110 includes travel information and therefore display the email in a travel itinerary view. In another example, the metadata parsing module 128 may determine that the content 114 of the email 110 is a receipt and therefore display the email 110 in a receipt view with other receipts received via email at the client device 104. In a further example the metadata parsing module 128 may determine that the email 110 includes images and open the email 110 in an image viewer. In an implementation, the metadata parsing module 128 performs these actions automatically and without user intervention.

Figure 6:
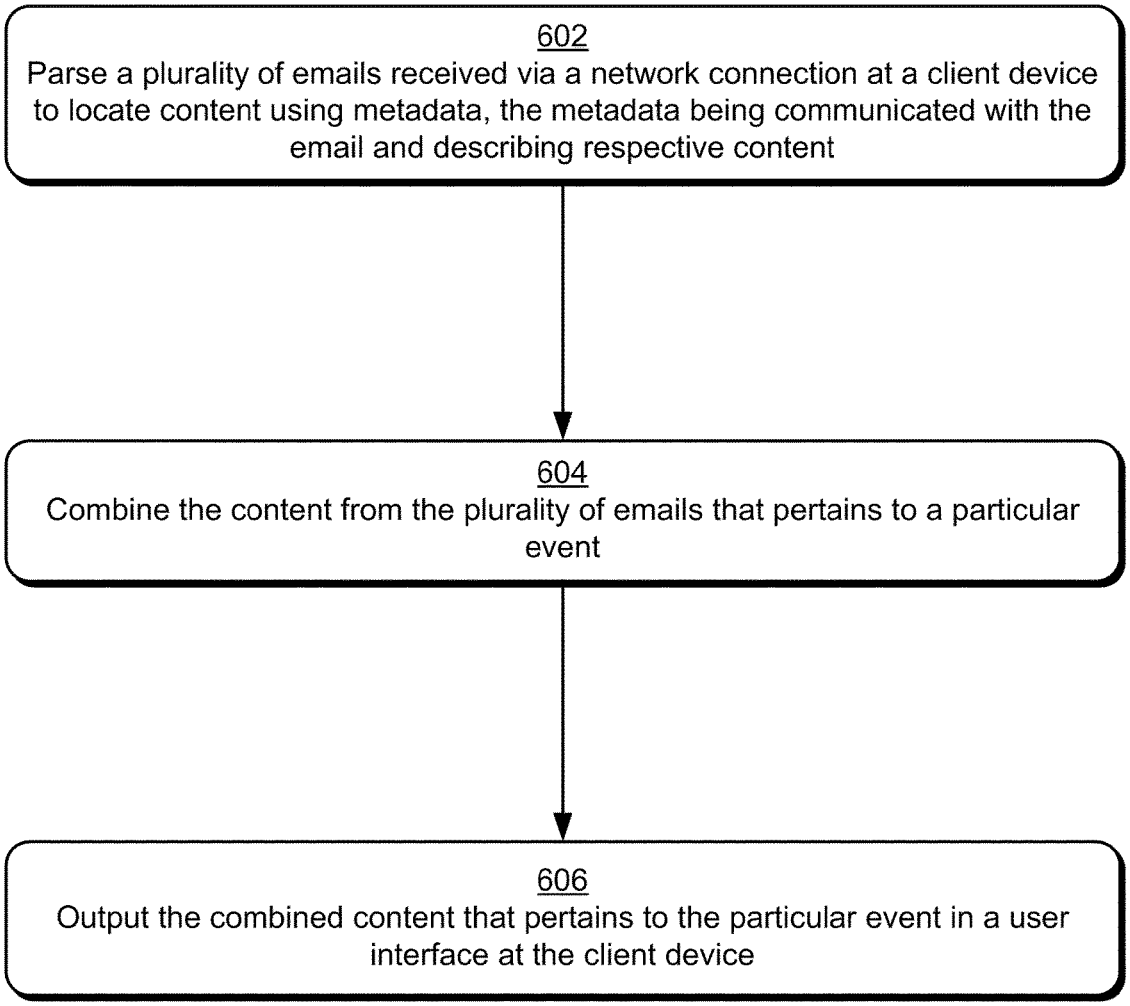
FIG. 6 is a flow diagram depicting a procedure in an example implementation in which content is combined from a plurality of emails that pertain to a particular event into a view.

FIG. 6 depicts a procedure 600 in an example implementation in which content is combined from a plurality of emails that pertain to a particular event into a view. A plurality of emails are parsed that are received via a network connection at a client device to locate content using metadata, the metadata being communicated with the email and describing respective content (block 602). As before, the metadata parsing module 128 may examine the metadata 116 that was communicated with emails 110 to the client device 104. This examination may be performed in real time as the emails 110 are received, at periodic intervals, responsive to selection of a particular view in the user interface (e.g., user interfaces 202, 302), and so on.

The content from the emails is combined that pertains to a particular event (block 604). The content 114, for example, may correspond to a particular date range, to a particular location that is not a user's home or business location (e.g., a trip), have a particular title (e.g., birthday party, wedding), and so on. Content 114 that corresponds to the particular event may then be combined into a view. In an implementation, specific content 114 is selected form the emails 110 such that some of the content from the email is not combined. For example, the content 114 to be combined might describe flight arrival and departure times. However, other content 114 (e.g., advertising) that is not considered pertinent in the view is not combined. Thus, the metadata parsing module 128 may leverage the metadata 116 to locate content 114 of potential interest to a user of the client device 104. The combined content is then output that pertains to the particular event in a user interface at the client device (block 606), e.g., the user interface 302 that displays a travel itinerary of FIG. 3.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining one or more types of composed textual or non-textual content are included in an email by a computing device through examination of metadata that describes the one or more types of composed textual or non-textual content, the email including a header and the composed content, the composed content including travel information;
   choosing one of a plurality of preconfigured travel itinerary views for the email by the computing device based on the determination, the plurality of views including different views that are each configured for presentation of a specific type of composed textual or non-textual content; and
   outputting the composed textual or non-textual content of the email in a user interface by the computing device using the chosen one of the preconfigured views.

2. A method as described in claim 1, wherein the metadata is communicated with the email over a network connection.

3. A method described in claim 2, wherein the metadata is set automatically and without user intervention at an originator of the email.

4. A method as described in claim 1, wherein the metadata is not displayed in the user interface.

5. A method as described in claim 1, wherein the metadata is arranged according to a schema to describe the types of content included in the email.

6. A method as described in claim 1, wherein the choosing is performed automatically and without user intervention by the one or more modules.

7. A method as described in claim 1, wherein the choosing is performed for a plurality of said emails and further comprising combining the content from the plurality of said emails.

8. A method as described in claim 7, wherein the combining is performed for the content that pertains to a particular event such that content from the plurality of said emails that does not pertain to the particular event is not combined.

9. A method as described in claim 1, wherein the determining, choosing, and outputting are implemented by one or more modules at the computing device that receives the email.

10. A method as described in claim 1, wherein the one or more types include social networks.

11. A method as described in claim 1, wherein the one or more types include commercial email.

12. A method as described in claim 11, wherein the commercial email is identifiable by shopping, finance, or travel metadata.

13. A method implemented by a client device, the method comprising:
   parsing a plurality of emails received via a network connection at the client device to identify composed content using metadata, the emails each including a header and composed content, the composed content including travel information, the metadata being communicated with the plurality of emails and describing respective said composed content;
   combining the composed content from the plurality of emails that pertains to a particular location; and
   outputting the combined composed content from the plurality of emails that pertains to the particular location in a user interface at the client device, the combined composed content being presented as a travel itinerary view that is configured for presentation of a specific type of composed content associated with the combined composed content without having to view each of the plurality of emails separately.

14. A method as described in claim 13, wherein the particular location involves travel.

15. A method as described in claim 13, wherein the metadata is specified by an originator of the email.

16. A method as described in claim 13, wherein at least one of the combined content is selectable to view a corresponding said email.

17. A method as described in claim 13, wherein the combining is performed for the content that pertains to the particular location such that content from the plurality of said emails that does not pertain to the particular location is not combined.

18. A method as described in claim 13, wherein the parsing, the combining, and the outputting are performed automatically and without user interaction.

19. A computing device comprising one or more processors and at least one memory that maintains instructions that re executable by the one or more processors to output a user interface as an email inbox having a plurality of representations of travel itinerary views that are selectable to show different combinations of composed textual or non-textual content taken from emails received by the computing device via a network, the emails each including header and composed content, the composed content including travel information, the different combinations of composed textual or non-textual content taken from the emails by examining metadata communicated with respective said emails that describe respective said composed textual or non-textual content in the email, at least some of the different combinations including a unique type of the composed textual or non-textual content taken from the emails.

20. The computing device as described in claim 19, wherein at least one said travel itinerary view is selectable to present a travel itinerary using the content taken from a plurality of emails.

21. The computing device in claim 19, wherein at least one said travel itinerary view is selectable to present bill information using the content taken from a plurality of emails.

22. The computing device as described in claim 19, wherein at least one said travel itinerary view is selectable to present images using the content taken from a plurality of emails.

* * * * *